(12) United States Patent
Kim et al.

(10) Patent No.: US 12,323,372 B2
(45) Date of Patent: Jun. 3, 2025

(54) RELAY CHATBOT LINKED TO MULTIPLE CHATBOTS

(71) Applicant: KAKAO CORP., Jeju-si (KR)

(72) Inventors: Yu Mi Kim, Seongnam-si (KR); No Suk Myung, Yongin-si (KR); Ji Soo Hwang, Yongin-si (KR)

(73) Assignee: KAKAO CORP., Jeju-si (KR)

( * ) Notice: Subject to any disclaimer, the term of this patent is extended or adjusted under 35 U.S.C. 154(b) by 462 days.

(21) Appl. No.: 16/220,111

(22) Filed: Dec. 14, 2018

(65) Prior Publication Data

US 2019/0199658 A1   Jun. 27, 2019

(30) Foreign Application Priority Data

Dec. 21, 2017   (KR) .................. 10-2017-0177524

(51) Int. Cl.
| | |
|---|---|
| *H04L 12/58* | (2006.01) |
| *G06F 16/9032* | (2019.01) |
| *G06N 20/00* | (2019.01) |
| *G10L 15/32* | (2013.01) |
| *H04L 51/02* | (2022.01) |
| *H04L 51/214* | (2022.01) |
| *H04L 51/04* | (2022.01) |
| *H04L 51/046* | (2022.01) |

(52) U.S. Cl.
CPC ........ *H04L 51/02* (2013.01); *G06F 16/90332* (2019.01); *G06N 20/00* (2019.01); *G10L 15/32* (2013.01); *H04L 51/214* (2022.05); *H04L 51/04* (2013.01); *H04L 51/046* (2013.01)

(58) Field of Classification Search
CPC ......... H04L 51/02; H04L 51/14; H04L 51/04; H04L 51/046; G10L 15/32; G06F 16/90332; G06N 20/00
USPC .......................................... 707/748
See application file for complete search history.

(56) References Cited

U.S. PATENT DOCUMENTS

| | | | |
|---|---|---|---|
| 8,739,272 B1 * | 5/2014 | Cooper .................. | H04L 63/20 726/13 |
| 10,581,765 B2 * | 3/2020 | Koukoumidis ....... | G06F 16/248 |
| 2018/0025726 A1 * | 1/2018 | Gatti de Bayser ..... | G10L 15/22 704/257 |
| 2018/0181558 A1 * | 6/2018 | Emery ................... | H04L 51/02 |

(Continued)

FOREIGN PATENT DOCUMENTS

| | | |
|---|---|---|
| JP | 2001337827 A | 12/2001 |
| KR | 1020080075748 A | 8/2008 |

(Continued)

*Primary Examiner* — Sherief Badawi
*Assistant Examiner* — Earl Elias
(74) *Attorney, Agent, or Firm* — HSML P. C.

(57) ABSTRACT

A chatbot server that provides an instant messaging service using a relay chatbot linked to multiple chatbots includes a receiving unit that receives, from a messenger server, a question message relevant to a service selected from multiple services and service account information corresponding to the selected service; a derivation unit that derives an answer to the question message using the relay chatbot corresponding to the service account information; and a transmission unit that transmits the answer to the messenger server, wherein the relay chatbot relays a user device to the multiple chatbots linked to the relay chatbot to derive the answer through at least one of the multiple chatbots.

17 Claims, 10 Drawing Sheets

(56) References Cited

U.S. PATENT DOCUMENTS

2018/0357310 A1* 12/2018 Eidem ................. H04L 63/0823
2019/0158433 A1*  5/2019 Yun ....................... H04L 51/02
2019/0173811 A1*  6/2019 Estrada ................ G06Q 30/016

FOREIGN PATENT DOCUMENTS

| KR | 101279001 B1 | 7/2013 | |
|---|---|---|---|
| KR | 101731867 B1 | 5/2017 | |
| KR | 1020170103586 A | 9/2017 | |
| WO | WO-2018037401 A1 * | 3/2018 | ............ G06F 16/00 |

* cited by examiner

RELAY CHATBOT LINKED TO MULTIPLE CHATBOTS

CROSS-REFERENCE TO RELATED APPLICATION

This application claims the benefit under 35 USC 119(a) of Korean Patent Application No. 10-2017-0177524 filed on Dec. 21, 2017, in the Korean Intellectual Property Office, the entire disclosures of which are incorporated herein by reference for all purposes.

TECHNICAL FIELD

The present disclosure relates to technologies for providing an instant messaging service and more particularly, technologies for providing an instant messaging service using a relay chatbot linked to multiple chatbots.

BACKGROUND

A chatbot is an artificial intelligence communication program that provides humans with right answers to questions or various relevant information through text chat with the humans based on artificial intelligence. Such a chatbot is provided as an interactive service using a messenger application according to preset rules or artificial intelligence technologies.

According to a conventional system for providing a chatbot service, each chatbot service is one-to-one mapped to each chatbot and a chat service is provided through the mapped chatbot. For example, if a chatbot server receives a chatbot ID for a first chatbot service and a question message from a user device through a messenger server, the chatbot server provides the user device with an answer to the question message through a first chatbot corresponding to the received chatbot ID via the messenger server, and if the chatbot server receives a chatbot ID for a second chatbot service and a question message from the user device through the messenger server, the chatbot server provides the user device with an answer to the question message through a second chatbot corresponding to the received chatbot ID via the messenger server.

According to the conventional chatbot service, each service is provided through a chatbot corresponding to the service. Therefore, an answer to a question message is uniform and it is difficult to derive the best answer to a question message.

SUMMARY

At least some of the embodiments described herein facilitate a server, a device and a method for deriving an answer to a question message relevant to a service selected by a user device among multiple services from any one of multiple chatbots linked to a relay chatbot corresponding to the selected service and transmitting the derived answer to the user device.

Further, at least some of the embodiments described herein facilitate a server, a device and a method for selecting a chatbot to process a question message from among multiple chatbots by using a machine learning model constituting a relay chatbot, deriving an answer to the question message through the selected chatbot, and providing the derived answer to a user device.

Furthermore, at least some of the embodiments described herein facilitate a server, a device and a method for deriving rankings of answers to a question message received from multiple chatbots through a relay chatbot, selecting an answer based on the derived rankings, and providing the selected answer to a user device.

Moreover, at least some of the embodiments described herein facilitate a server, a device and a method for selecting a chatbot to process a question message by using a machine learning model constituting a relay chatbot, deriving an answer to the question message through the selected chatbot, and providing the derived answer to a user device.

Besides, at least some of the embodiments described herein facilitate a server, a device and a method for deriving an answer which is most appropriate for a user's intent of question from among answers derived by multiple chatbots by using a relay chatbot that relays the multiple chatbots to a user device without directly transmitting a question message to each chatbot.

At least some of the embodiments described herein pertain to a chatbot server that provides an instant messaging service using a relay chatbot linked to multiple chatbots that includes: a receiving unit that receives, from a messenger server, a question message relevant to a service selected from multiple services and service account information corresponding to the selected service; a derivation unit that derives an answer to the question message using the relay chatbot corresponding to the service account information; and a transmission unit that transmits the answer to the messenger server, wherein the relay chatbot relays a user device to the multiple chatbots linked to the relay chatbot to derive the answer through at least one of the multiple chatbots.

At least one of the embodiments described herein pertains to a method for providing an instant messaging service by a chatbot server using a relay chatbot linked to multiple chatbots that includes: receiving, from a messenger server, a question message relevant to a service selected from multiple services and service account information corresponding to the selected service; deriving an answer to the question message through at least one of multiple chatbots linked to the relay chatbot corresponding to the service account information by using the relay chatbot to relay the user device and the multiple chatbots; and transmitting the derived answer to the messenger server.

According to any one of the embodiments described above, it is possible to provide a server, a device and a method for deriving an answer to a question message relevant to a service selected by a user device among multiple services from any one of multiple chatbots linked to a relay chatbot corresponding to the selected service and transmitting the derived answer to the user device.

Further, it is possible to provide a server, a device and a method for selecting a chatbot to process a question message from among multiple chatbots by using a machine learning model constituting a relay chatbot, deriving an answer to the question message through the selected chatbot, and providing the derived answer to a user device.

Furthermore, it is possible to provide a server, a device and a method for deriving rankings of answers to a question message received from multiple chatbots through a relay chatbot, selecting an answer based on the derived rankings, and providing the selected answer to a user device.

Moreover, it is possible to provide a server, a device and a method for selecting a chatbot to process a question message by using a machine learning model constituting a relay chatbot, deriving an answer to the question message through the selected chatbot, and providing the derived answer to a user device.

Besides, it is possible to provide a server, a device and a method for deriving an answer which is most appropriate for a user's intent of question from among answers derived by multiple chatbots by using a relay chatbot that relays the multiple chatbots to a user device without directly transmitting a question message to each chatbot.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Figure 1:
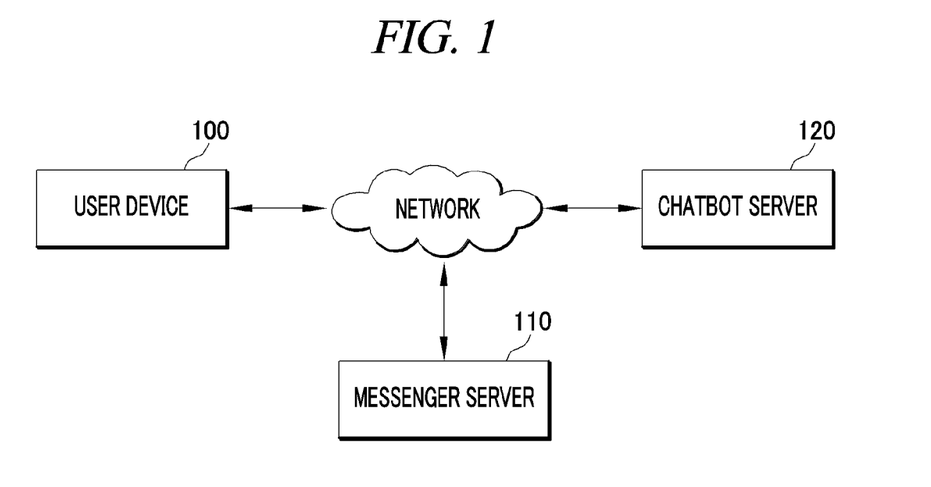
FIG. 1 is an illustration of an example of an instant messaging service providing system in accordance with various embodiments described herein.

FIG. 1 is an illustration of an example of an instant messaging service providing system in accordance with at least one embodiment described herein.

Referring to FIG. 1, an instant messaging service providing system may include a user device 100, a messenger server 110, and a chatbot server 120. The instant messaging service providing system illustrated in FIG. 1 is just an embodiment of the present disclosure and should not be construed as liming the present disclosure. That is, the instant messaging service providing system can be configured differently from that shown in FIG. 1 according to various embodiments of the present disclosure.

Friends who can be registered through a messenger app installed in the user device 100 may include real friends and virtual friends.

A user of the user device 100 may register another user without a profit-making purpose (e.g., family, acquaintances, coworkers, etc.) as a real friend through the messenger app.

The user device 100 may provide the user with an instant messaging service that enables the user to exchange chats with the other user registered as a real friend in a chat room through the messenger app installed in the user device 100.

Further, the user of the user device 100 may register an official account corresponding to a specific service as a virtual friend through the messenger app. The official account may refer to an account that is managed by a specific company and organization to provide the specific service. For example, the official account may provide information about the specific service to the user device 100 through a chat room established for the official account and the user device 100. The user device 100 may register the official account as a virtual friend and receive the information about the specific service from the official account. Even if the user device 100 does not register the official account as a virtual friend, the user device 100 may also receive the information about the specific service.

The official account may use a chatbot to provide the user device 100 with the information about the specific service provided by the specific company and organization. A manager of the official account may create the chatbot through a user interface for bot builder provided by the chatbot server 120 and link the created chatbot to the official account to provide the information about the specific service (for example, an answer to a question message relevant to the specific service). Further, the manager of the official account may manage the official account matched with a chatbot one to one through the user interface for bot builder or extend and link the official account to multiple chatbots.

Further, the user of the user device 100 may register a relay chatbot corresponding to the specific service as a virtual friend through the messenger app. The relay chatbot refers to a chatbot that relays the user device 100 to multiple chatbots to provide a relay service. The user device 100 may be provided with an answer to a question message through the relay chatbot.

Therefore, if the user device 100 registers an official account as a virtual friend and the official account is mapped to a relay chatbot, the user device 100 may be provided with an answer to a question message through the relay chatbot linked to the official account, and if the user device 100 registers a relay chatbot as a virtual friend, the user device 100 may be provided with an answer to a question message through the relay chatbot.

The user device 100 may provide the user with an instant messaging service that enables the user to exchange chats with, e.g., a relay chatbot or an official account registered as a virtual friend in a chat room through the messenger app. Further, the user device 100 may invite the relay chatbot registered as a virtual friend into a chatroom established for the user device 100 and a real friend.

The user device 100 may receive selection of any one of multiple services provided through the messenger app installed in the user device 100 from the user. For example, the multiple services may include a service provided by the official account and a service provided by the relay chatbot. If the user selects the official account or the relay chatbot which are virtual friends, the user can be provided with the service provided by the official account or the service provided by the relay chatbot through the chat room.

If the user device 100 receives selection of one of the multiple services provided through the messenger app installed in the user device 100 from the user, the user device 100 may transmit service account information corresponding to the selected service to the messenger server 110. For example, the service account information may include a chatbot ID corresponding to the selected service or an official account ID of an official account corresponding to the selected service.

Further, if the user device 100 receives a question message relevant to the service selected by the user from the user through the chat room, the user device 100 may transmit the question message to the messenger server 110. The service account information and the question message may be transferred to the chatbot server 120 via the messenger server 110.

The messenger server 110 may provide an instant messaging service that enables the user device 100 to exchange chats with another user registered as a real friend in a chat room. Further, the messenger server 110 may provide an instant messaging service that enables the user device 100 to exchange chats with a relay chatbot or official account registered as a virtual friend at the messenger app.

For example, if the messenger server 110 receives a chatbot ID and a question message relevant to the selected service from the user device 100, the messenger server 110 may transfer the received chatbot ID and question message to the chatbot server 120. For another example, if the messenger server 110 receives an official account ID and a question message relevant to the selected service from the user device 100, the messenger server 110 may transfer the received official account ID (or a chatbot ID mapped to the received official account ID) and the received question message to the chatbot server 120.

The messenger server 110 may receive an answer to the question message derived through the relay chatbot from the chatbot server 120. The messenger server 110 may transmit the received answer to a chat room established for the user device 100 and the chatbot or a chat room established for the user device 100 and the official account.

If the chatbot server 120 receives an official account ID and a question message from the messenger server 110 and the official account ID is mapped to a relay chatbot, the chatbot server 120 may derive an answer to the question message using the relay chatbot corresponding to the official account ID. Further, if the chatbot server 120 receives a chatbot ID and a question message from the messenger server 110, the chatbot server 120 may derive an answer to the question message using a relay chatbot corresponding to the chatbot ID. Herein, the relay chatbot relays the user device to multiple chatbots linked to the relay chatbot and thus can derive an answer to a question message from at least one of the multiple chatbots.

The chatbot server 120 may transmit the derived answer to the messenger server 110. The answer transmitted to the messenger server 110 may be transmitted to the user device 100.

A relay chatbot suggested in the present disclosure is a chatbot that provides a relay service between multiple chatbots and may refer to an intermediate medium configured to dynamically transfer a question message of the user to all of multiple chatbots and derive the most appropriate answer to the question message according to a relay policy of a chatbot manager (e.g., a method for selecting a chatbot to derive the most appropriate answer to the user's question message from among multiple chatbots).

The operations of the respective components included in the instant messaging service providing system illustrated in FIG. 1 will be described in more detail with reference to the accompanying drawings.

Figure 2:
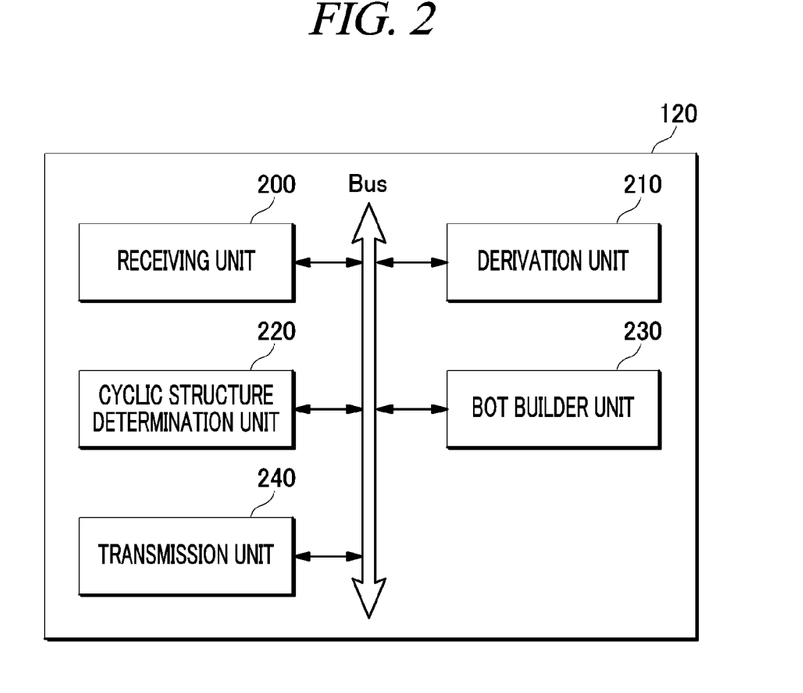
FIG. 2 is an illustration of an example of a chatbot server in accordance with various embodiments described herein.

FIG. 2 is an illustration of an example of the chatbot server 120 in accordance with an embodiment of the present disclosure. Referring to FIG. 2, the chatbot server 120 according to an embodiment of the present disclosure may include a receiving unit 200, a derivation unit 210, a cyclic structure determination unit 220, a bot builder unit 230, and a transmission unit 240. However, the chatbot server 120 according to an embodiment of the present disclosure can be configured differently from that shown in FIG. 2.

If the receiving unit 200 receives selection of one of multiple services registered at a messenger app that provides an instant messaging service from the user of the user device 100, the receiving unit 200 may receive service account information corresponding to the selected service from the messenger server 110.

For example, if the receiving unit 200 receives selection of a service provided by a specific official account among the multiple services from the user of the user device 100, the receiving unit 200 may receive an official account ID corresponding to the selected service from the messenger server 110.

For another example, if the receiving unit 200 receives selection of a service provided by a specific chatbot among the multiple services from the user of the user device 100, the receiving unit 200 may receive a chatbot ID corresponding to the selected service from the messenger server 110.

If the user of the user device 100 selects a service of the relay chatbot registered at the messenger app, the receiving unit 200 may receive an ID of the relay chatbot from the messenger sever 110. For example, if the user of the user device 100 selects a specific service from among multiple services registered at the messenger app and a chatbot corresponding to the selected specific service is a relay chatbot, the receiving unit 200 may receive a relay chatbot ID corresponding to the selected specific service from the messenger server 110. In this case, the relay chatbot may be a chatbot that is linked to multiple chatbots relevant to the specific service for questions/answers relevant to the specific service to relay the user device 100 and the multiple chatbots.

The receiving unit 200 may receive a question message relevant to a service selected by the user from the messenger server 110. For example, if the user selects a music service, the receiving unit 200 may receive a question message relevant to the music service from the messenger server 110.

The derivation unit 210 may derive an answer to a question message by using a relay chatbot corresponding to the relay chatbot ID received from the messenger server 110.

The derivation unit 210 may transfer the question message received from the messenger server 110 to the relay chatbot corresponding to the received relay chatbot ID. In this case, the relay chatbot may derive an answer by relaying the user device and the multiple chatbots linked to the relay chatbot. The relay chatbot may transfer the question message to at least one of the multiple chatbots linked to the relay chatbot. The at least one chatbot that has received the question message may derive an answer to the question message and transfer the answer to the relay chatbot.

For example, the derivation unit 210 may derive a chatbot ID of a chatbot to process the question message through the relay chatbot and transfer the derived chatbot ID to a bot DB (not illustrated), and the bot DB may detect bot metadata corresponding to the received chatbot ID from bot-relevant metadata previously stored therein. Then, the derivation unit 210 may receive the bot metadata of the chatbot corresponding to the chatbot ID from the bot DB and derive an answer to the question message based on the received bot metadata of the chatbot.

Figure 3A:
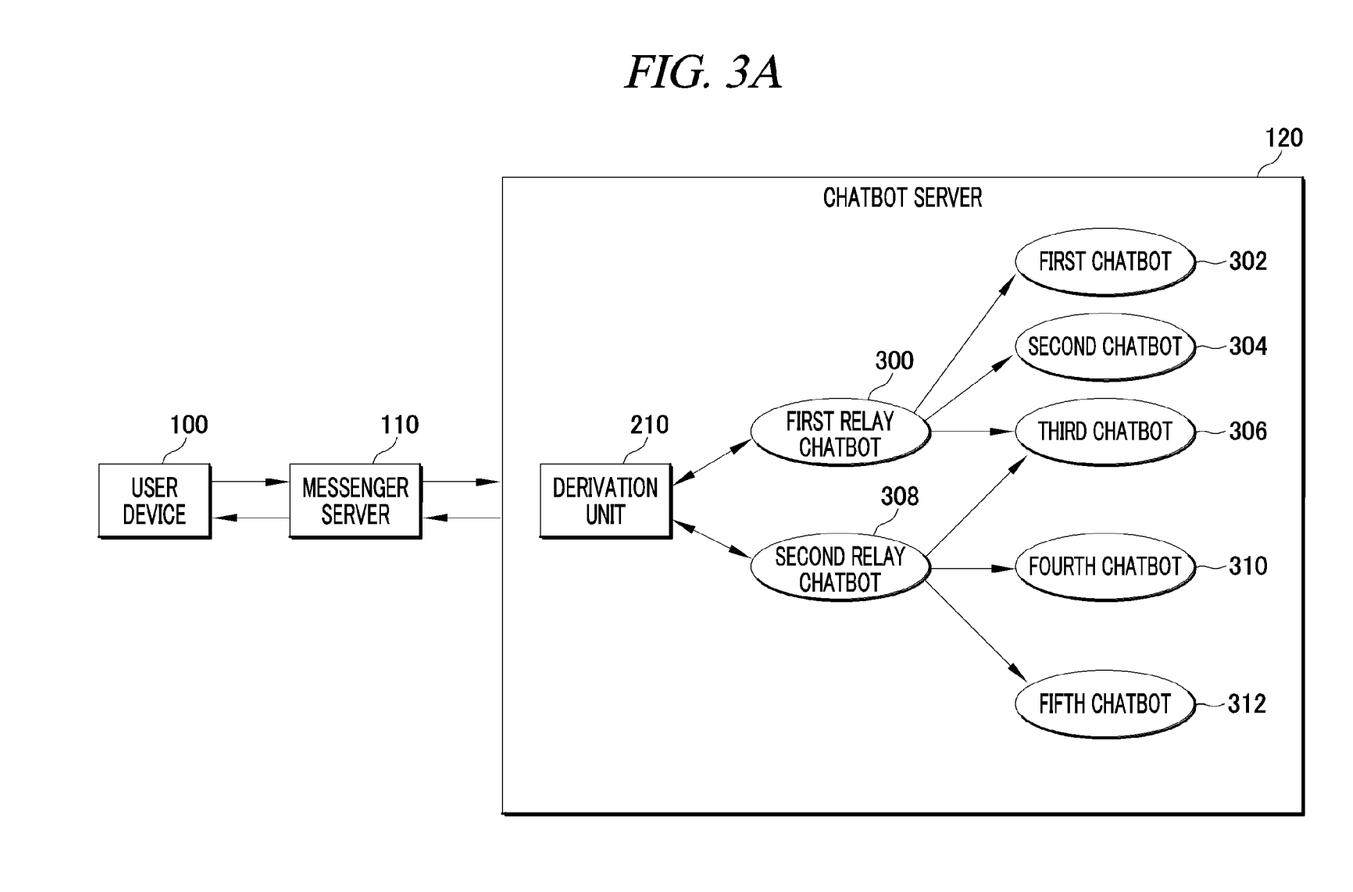
FIG. 3A to FIG. 3C are diagrams provided to explain a method for providing an instant messaging service using a relay chatbot in accordance with various embodiments described herein.

Referring to FIG. 3A, the multiple services are allocated relay chatbot IDs corresponding to the respective services and the services are provided through relay chatbots corresponding to the respective allocated relay chatbot IDs. For example, a first service is assumed to be a service provided by an official account of a company A. To provide the first service, an official account corresponding to the first service may be mapped to a first relay chatbot 300 and an answer selected by the first relay chatbot 300 from among answers to a question message processed by multiple chatbots 302, 304, and 306 linked to the first relay chatbot 300 may be provided to the user device 100 through the messenger server 110.

For another example, a second service is assumed to be a service provided by an official account of a company B. To provide the second service, an official account corresponding to the second service may be mapped to a second relay chatbot 308 and an answer selected by the second relay chatbot 308 from among answers to a question message processed by multiple chatbots 306, 310, and 312 linked to the second relay chatbot 308 may be provided to the user device 100 through the messenger server 110.

Each relay chatbot is linked to multiple chatbots that derive answers to a question message for each service and relays the user device and the multiple chatbots linked to the relay chatbot. For example, referring to FIG. 3A, the first relay chatbot 300 configured to provide an answer to a question message relevant to a music service may be linked to a first chatbot 302 and a second chatbot 304 linked to external servers (e.g., Melon music server, Bugs music server, etc.) which are 3$^{rd}$ parties providing a music service and may be linked to a third chatbot 306 linked to a search engine providing a search service and may relay the user device and the multiple chatbots 302, 304, and 306 linked thereto.

At least one of multiple chatbots may be shared by a relay chatbot and another relay chatbot. A chatbot is not linked to only one relay chatbot. A chatbot can be linked to another relay chatbot even if it has been already linked to a specific relay chatbot. Therefore, in the present disclosure, different relay chatbots may share a specific chatbot. For example, referring to FIG. 3A, the third chatbot 306 linked to the search engine among the multiple chatbots 302, 304, and 306 linked to the first relay chatbot 300 may be shared by the second relay chatbot 308 configured to provide an answer to a question message relevant to a weather service.

Figure 3B:
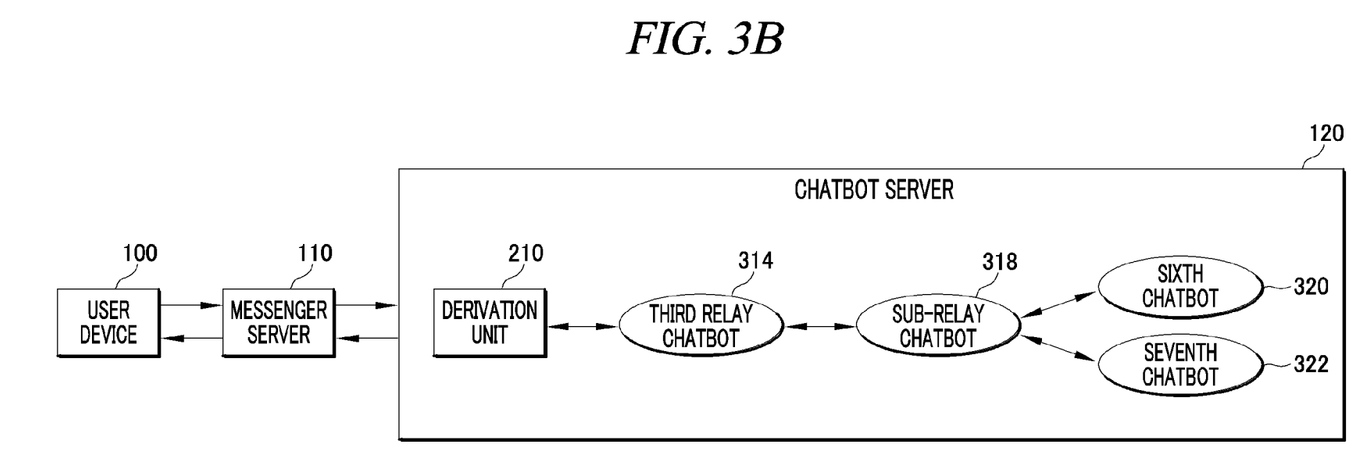

A relay chatbot may relay another relay chatbot linked to the relay chatbot to derive an answer to a question. For example, referring to FIG. 3B, a third relay chatbot 314 configured to provide an answer to a question message relevant to a food service may relay a sub-relay chatbot 318 that is in charge of a service relevant to a specific food included in the food service. Herein, the third relay chatbot 314 may transfer a food-relevant question message to the sub-relay chatbot 318 and the sub-relay chatbot 318 may transfer answers derived by multiple chatbots 320 and 322 linked to the sub-relay chatbot 318 to the third relay chatbot 314.

The cyclic structure determination unit 220 may determine whether or not different relay chatbots form a cyclic structure that enables them to relay each other. In this case, the cyclic structure determination unit 220 may monitor traffic between a relay chatbot and a sub-chatbot of the relay chatbot. The cyclic structure determination unit 220 is not an essential but optional component as a unit constituting the chatbot server 120.

Figure 3C:
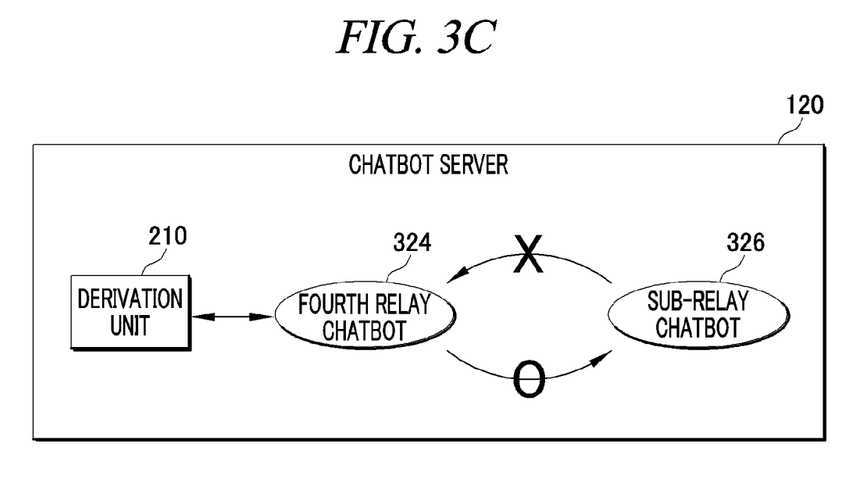

Referring to FIG. 3C, the cyclic structure determination unit 220 may monitor traffic of communication of question messages and communication of answers between a fourth relay chatbot 324 and its sub-chatbot 326 linked to the fourth relay chatbot 324 to check whether there is a cycle of cyclic structure in order to suppress a cyclic structure that enables the fourth relay chatbot 324 and its sub-chatbot 326 to relay each other. In this case, the cyclic structure determination unit 220 may set only the fourth relay chatbot 324, which is a super-relay chatbot, to conduct relay.

The bot builder unit 230 may provide a device of the manager with a user interface that enables the manager to manage a relay chatbot. For example, the bot builder unit 230 may provide the manager device with a function of designing relay chatbots corresponding to respective services or adding or deleting the relay chatbots through the user interface.

For example, the chatbot manager may access the user interface which is provided by the bot builder unit 230 of the chatbot server 120 and through which a relay chatbot can be managed, through an application or website. The chatbot manager may create a relay chatbot for relaying a specific service using the user interface and select at least one chatbot suitable for the relay policy of the chatbot manager from among multiple chatbots previously stored in a database of the chatbot server 120 and set the selected chatbot to be linked to the relay chatbot.

The transmission unit may transmit the derived answer to the messenger server 110, and the answer may be transmitted from the messenger server 110 to the user device 100. Specifically, the transmission unit 240 may transmit profile information of the relay chatbot corresponding to the service selected by the user and profile information of the chatbot that derives the answer together with the derived answer to the messenger server 110, and the answer may be transmitted from the messenger server 110 to the user device 100.

The profile information of the chatbot may include a homepage (e.g., a specific music service homepage if the chatbot is relevant to a music service) and link information of the chatbot that derives the answer. In this case, if a region corresponding to the profile information of the chatbot is selected by the user from the answer output through the user device 100, the selection takes the user to the homepage of the chatbot.

The profile information of the relay chatbot may include, for example, ID information of the relay chatbot and information about a $3^{rd}$ party server linked to the multiple chatbots that the relay chatbot relays. For example, if a region corresponding to the profile information of the relay chatbot is selected by the user through the user device 100, the selection takes the user to a page which provides the ID information of the relay chatbot and the information about the $3^{rd}$ party server linked to the multiple chatbots that the relay chatbot relays.

Hereinafter, a method for selecting a chatbot which can provide the most appropriate answer to the user device 100 from among the multiple chatbots by the relay chatbot will be described.

In an embodiment, the relay chatbot may derive scores of the multiple chatbots and select a chatbot for providing an answer to the user device 100 based on the derived scores. This is a non-polling model which can be performed without transferring a question message to each chatbot.

Figure 4A:
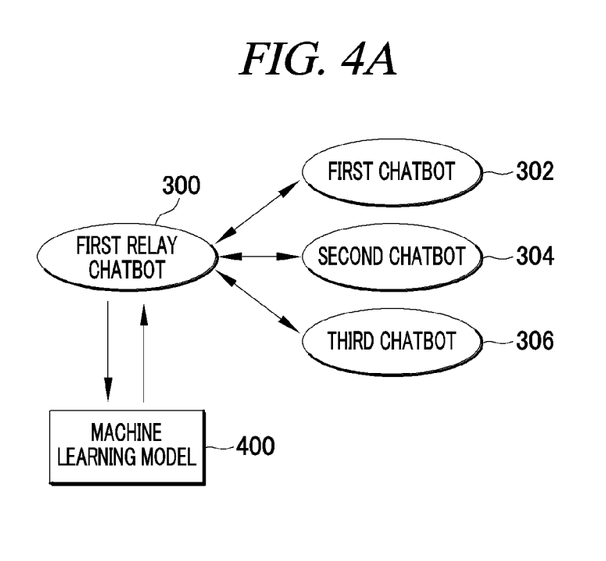
FIG. 4A to FIG. 4C are diagrams provided to explain a method for deriving an answer to a question message in accordance with various embodiments described herein.

For example, referring to FIG. 4A, the relay chatbot may input a question message into a machine learning model 400 to derive scores of the respective multiple chatbots linked to the relay chatbot, select any one of the multiple chatbots based on the derived scores, and transfer the question message to the selected chatbot. In this case, the chatbot selected by the relay chatbot may output an answer to the question message and transfer the derived answer to the relay chatbot. Herein, the machine learning model 400 may be configured to predict probability values of processing a question message by the multiple chatbots and derive scores based on the predicted probability values.

A score may be calculated based on a processing ratio of a chatbot that has previously derived an answer provided to the user device 100, a processing ratio of a chatbot that has derived an answer preferred by the user device 100, or a processing ratio of a chatbot that has derived an answer considered as the most appropriate answer based on context information of a chat between the user device 100 and the chatbot, or may be calculated based on a processing ratio of a chatbot that has derived an answer provided to multiple user devices or a processing ratio of a chatbot that has derived an answer preferred by the multiple user devices. For example, the first relay chatbot 300 may derive scores of processing a question message by the respective multiple chatbots 302, 304, and 306 by using the machine learning model 400. If a score of processing a question message by the first chatbot 302 is 50, a score of the second chatbot 304 is 80, and a score of the third chatbot 306 is 60, the first relay chatbot 300 may select the second chatbot 304 with the highest score and transfer the question message only to the selected second chatbot 304. In this case, the second chatbot 304 may derive an answer to the question message received from the first relay chatbot 300 and transfer the derived answer to the first relay chatbot 300.

Figure 4B:
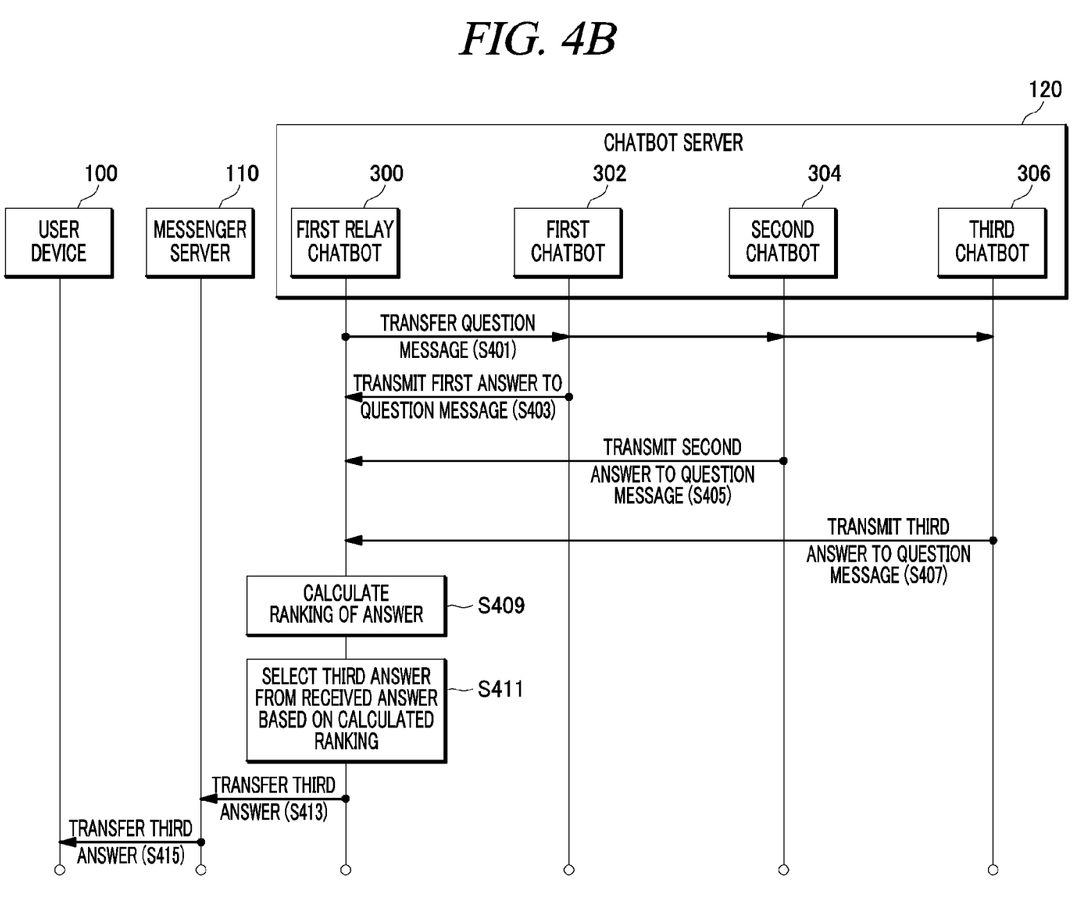

In another embodiment, the relay chatbot may transfer a question message to all of the multiple chatbots, calculate rankings of answers derived from the respective chatbots, and select a chatbot for providing an answer to the user device 100 based on the calculated rankings. This is a polling model which can be performed by transferring a question message to each chatbot.

For example, referring to FIG. 4B, the relay chatbot may transfer a question message to all of the multiple chatbots linked to the relay chatbot, calculate rankings of answers to the question message received from the respective chatbots, and select one of the answers. In this case, the selected answer may be transferred to the user device 100 through the transmission unit 240. The rankings of the answers may be determined using, for example, a ranking learning algorithm based on a probability distribution of probability of an answer to be preferred by the user of the user device 100 or a probability distribution of probability of an answer considered as the most appropriate answer based on context information of a chat between the user device 100 and the chatbot, or may be determined based on a probability distribution of probability of an answer to be preferred by users of the multiple user devices. Herein, the probability distribution of probability of an answer to be preferred by the user may be created by, for example, an answer preference score assigned to each of multiple answers to previous multiple question messages for respective multiple services.

For example, in a process S401, the first relay chatbot 300 transfers a question message received from the user device 100 to each of the first chatbot 302, the second chatbot 304, and the third chatbot 306 linked to the first relay chatbot 300. The first relay chatbot 300 receives a first answer to the question message from the first chatbot 302 in a process S403, a second answer to the question message from the second chatbot 304 in a process S405, and a third answer to the question message from the third chatbot 306 in a process S407. In a process S409, the first relay chatbot 300 may calculate rankings of the received first, second and third answers, respectively. In a process S411, if the received first answer's ranking is 2nd, the received second answer's ranking is 3rd and the received third answer's ranking is 1st, the first relay chatbot 300 may select the highest-ranking third answer. In a process S413, the first relay chatbot 300 may transmit the selected highest-ranking third answer to the messenger server 110 through the transmission unit 240, and in a process S415, the messenger server 110 may transmit the received answer to the user device 100.

Figure 4C:
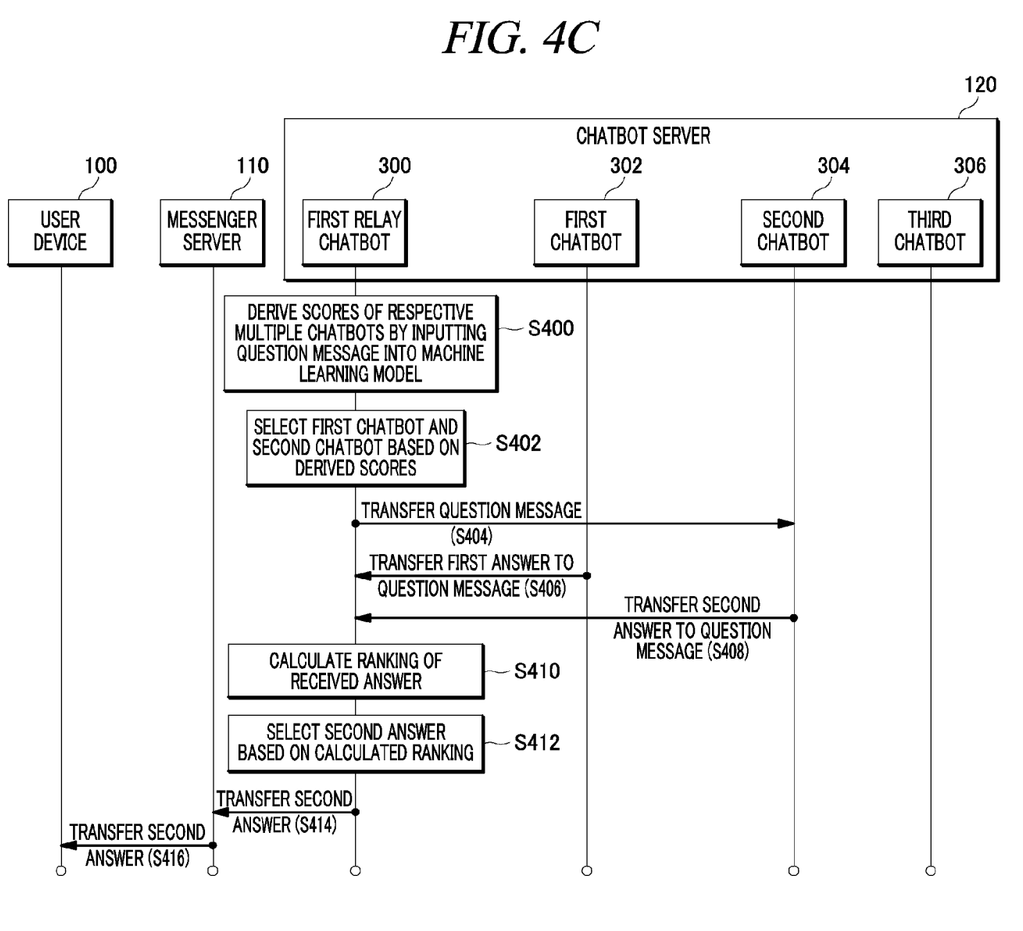

In yet another embodiment, the relay chatbot may select a chatbot for providing an answer to the user device 100 by using a hybrid model that combines the non-polling model and the polling model.

For example, referring to FIG. 4C, the relay chatbot may select two or more chatbots based on scores of processing a question message by the respective chatbots by using the machine learning model, transmit the question message to the selected two or more chatbots, and select an answer to be transferred to the user device 100 based on rankings of answers to the question message received from the selected two or more chatbots.

For example, in a process S400, the first relay chatbot 300 may input a question message into the machine learning model to derive scores of the respective multiple chatbots 302, 304, and 306. In a process S402, the first relay chatbot 300 may select the first chatbot 302 and the second chatbot 304 whose scores are equal to or higher than a predetermined score (e.g., 60) from among the multiple chatbots 302, 304, and 306 based on the derived scores. In a process S404, the first relay chatbot 300 may transfer the question message to each of the selected first chatbot 302 and second chatbot 304. The first relay chatbot 300 may receive a first answer to the question message from the first chatbot 302 in a process S406 and a second answer to the question message from the second chatbot 304 in a process S408. In a process S410, the first relay chatbot 300 may calculate rankings of the received first and second answers. In a process S412, the first relay chatbot 300 may select the higher-ranking second answer from among the 2nd-ranking first answer and the 1st-ranking second answer. In a process S414, the first relay chatbot 300 may transmit the selected higher-ranking second answer to the messenger server 110 through the transmission unit 240. In a process S416, the messenger server 110 may transmit the received second answer to the user device 100.

Meanwhile, if the relay chatbot cannot derive an answer to a question message through the multiple chatbots linked to the relay chatbot, the relay chatbot may directly derive an answer to the question message.

Figure 5:
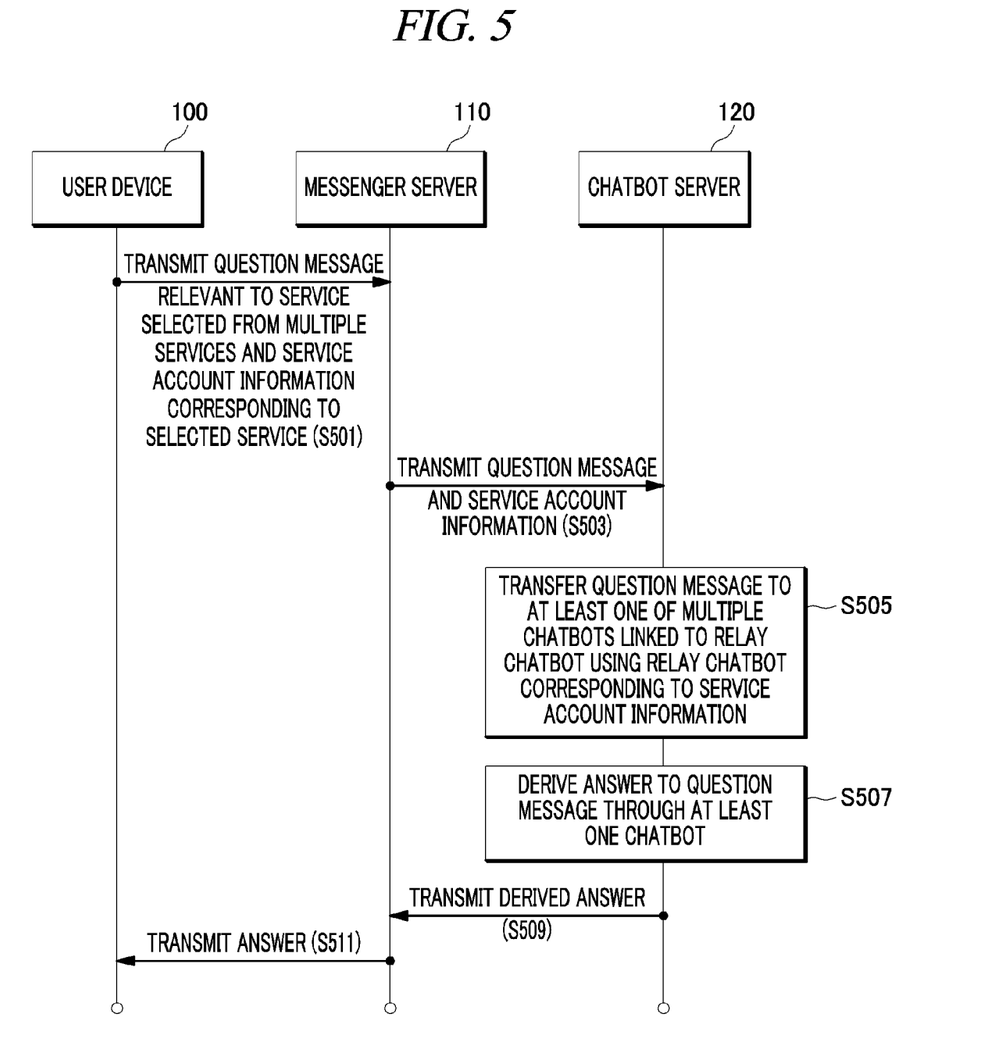
FIG. 5 is a flowchart illustrating an example processing flow for providing an instant messaging service through a chatbot server in accordance with various embodiments described herein.

FIG. 5 is a flowchart illustrating an example processing flow for providing an instant messaging service through the chatbot server 120 in accordance with an embodiment of the present disclosure. Referring to FIG. 5, in a process S501, the user device 100 may transmit a question message relevant to a service selected by the user of the user device 100 from among multiple services and service account information corresponding to the selected service to the messenger server 110. In a process S503, the messenger server 110 may transmit the received question message and service account information to the chatbot server 120. In a process S505, the chatbot server 120 may transfer the question message to at least one of multiple chatbots linked to a relay chatbot corresponding to the service account information by using the relay chatbot. In a process S507, the chatbot server 120 may derive an answer to the question message through the at least one chatbot. In a process S509, the chatbot server 120 may transmit the derived answer to the messenger server 110, and in a process S511, the messenger server 110 may transmit the received answer to the user device 100.

Figure 6:
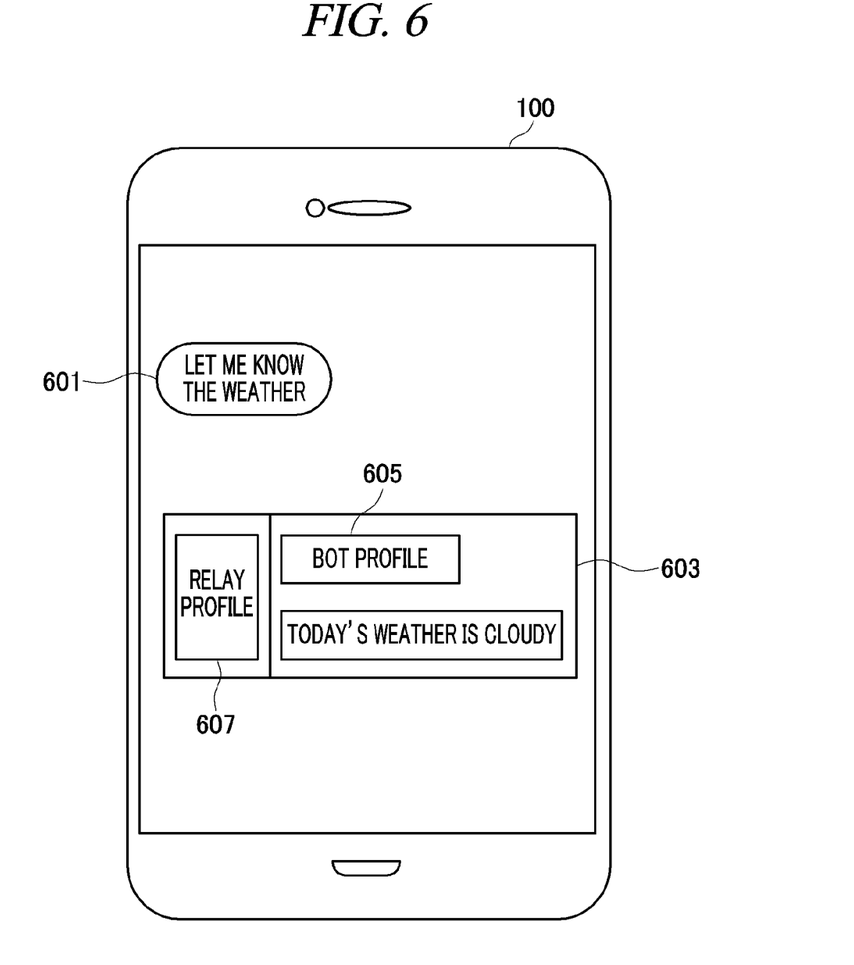
FIG. 6 is a diagram showing an example answer to a question message in accordance with various embodiments described herein.

FIG. 6 is a diagram showing an example answer to a question message in accordance with an embodiment of the present disclosure. For example, referring to FIG. 6, if the user device 100 selects a friend corresponding to a weather service, the user device 100 can chat with a relay chatbot corresponding to the selected friend about the weather. For example, if the user device 100 transmits a question message 601 including "Let me know the weather" to the chatbot server 120 through the messenger server 110, the chatbot server 120 may transmit an answer 603 of a chatbot selected by the relay chatbot corresponding to the weather service to the user device 100 through the messenger server 110. In this case, the answer 603 of the selected chatbot corresponds to any one answer selected by the relay chatbot corresponding to the weather service from among answers derived by one or more of multiple chatbots linked to the relay chatbot. The answer 603 received by the user device 100 includes profile information 605 of the chatbot that has derived the answer and profile information 607 of the relay chatbot corresponding to the weather service and may include an answer (e.g., "Today's weather is cloudy" or the like) to the question message.

The profile information 607 of the relay chatbot may include, for example, ID information of the relay chatbot and information about a $3^{rd}$ party server linked to the multiple chatbots that the relay chatbot relays. The profile information 605 of the chatbot that has derived the answer may include link information for a homepage of the chatbot. For example, if the user device 100 selects a region 605 corresponding to the profile information of the chatbot from the answer 603 output through the messenger app, the selection takes the user to the homepage of the chatbot. If the user device 100 selects a region 607 corresponding to the profile information of the relay chatbot, the user of the user device 100 can check a page which provides the ID information of the relay chatbot and the information about the $3^{rd}$ party server linked to the multiple chatbots that the relay chatbot relays.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A chatbot server that provides an instant messaging service using a relay chatbot linked to multiple chatbots, comprising:
   a receiving unit that:
      receives, from a messenger server corresponding to a messenger app, a selection of a service from multiple services and service account information corresponding to the selected service,
      establishes a chatroom hosted on the messenger server, through the messenger app and based on the received service account information, between a user device and the relay chatbot to provide the selected service, wherein the relay chatbot is linked to the multiple chatbots, and
      receives a question message relevant to the selected service, the question message being input to the chatroom established through the messenger app;
   a derivation unit that derives an answer to the question message by:
      transferring the question message to the relay chatbot, and wherein the question message is transferred from the relay chatbot to at least one of the multiple chatbots linked to the relay chatbot corresponding to the service account information, wherein the at least one of the multiple chatbots is linked to the relay chatbot and to a different relay chatbot, wherein the relay chatbot is provided between the multiple chatbots and the user device, and wherein the relay chatbot and the different relay chatbot are configured to only relay the question message and select an answer to the question message from multiple answers to the question message provided by the multiple chatbots; and a transmission unit that transmits the answer to the messenger server, wherein, when the relay chatbot relays a sub relay chatbot linked to the relay chatbot to derive the answer to the question message, the sub relay chatbot is set to relay the question message to the multiple chatbots and does not relay the question message to the relay chatbot, but transfer the answers to the question message from the at least one of the multiple chatbots to the relay chatbot.

2. The chatbot server of claim 1, wherein the relay chatbot is configured to only relay the question message and select an answer to the question message by:

inputting the question message into a machine learning model to derive scores of the multiple answers of the respective multiple chatbots, without directly transmitting the question message to each of the multiple chatbots;

selecting one of the multiple chatbots based on the derived scores; and transferring the question message only to the selected chatbot, and wherein only the selected chatbot outputs the answer to the question message.

3. The chatbot server of claim 1, wherein the relay chatbot is configured to only relay the question message and select an answer to the question message by:

transferring the question message to all of the multiple chatbots;

receiving answers to the question message from the respective multiple chatbots;

calculating rankings of the received answers; and selecting any one of the received answers based on the calculated rankings, wherein the transmission unit transmits the selected answer to the messenger server.

4. The chatbot server of claim 1, wherein the relay chatbot is configured to only relay the question message and select an answer to the question message by:

inputting the question message into a machine learning model to derive scores of the respective multiple chatbots;

selecting at least one of the multiple chatbots based on the derived scores;

transferring the question message to the at least one chatbot;

receiving answers to the question message from the at least one chatbot;

calculating rankings of the answers; and selecting any one of the received answers based on the calculated rankings, wherein the transmission unit transmits the selected answer to the messenger server.

5. The chatbot server of claim 1, further comprising:

a cyclic structure determination unit that determines whether or not different relay chatbots form a cyclic structure that enables them to relay each other.

6. The chatbot server of claim 5, wherein the cyclic structure determination unit monitors traffic between the relay chatbot and the sub relay chatbot of the relay chatbot.

7. The chatbot server of claim 1, wherein the answer includes profile information of the relay chatbot and profile information of the chatbot that has derived the answer.

8. The chatbot server of claim 7, wherein the profile information is linked to a homepage of the chatbot that has derived the answer, and if a region corresponding to the profile information is selected from the answer output through the user device, the homepage is provided to the user device.

9. The chatbot server of claim 1, further comprising:

a bot builder unit that provides a user interface that enables the relay chatbot to be managed.

10. The chatbot server of claim 1, wherein the multiple services include at least one of a service provided by an official account and a service provided by the relay chatbot.

11. The chatbot server of claim 2, wherein the scores are derived based on at least one of a processing ratio of a chatbot that has previously derived an answer provided to the user device, a processing ratio of a chatbot that has derived an answer preferred by the user device, and a processing ratio of a chatbot that has derived an answer considered as an appropriate answer based on context information of a chat between the user device and the chatbot.

12. A method for providing an instant messaging service by a chatbot server using a relay chatbot linked to multiple chatbots, comprising:

receiving, from a messenger server corresponding to a messenger app, a selection of a service from among multiple services and service account information corresponding to the selected service, establishing a chatroom hosted on the messenger server, through the messenger app and based on the received service account information, between a user device and a relay chatbot to provide the selected service, wherein the relay chatbot is linked to the multiple chatbots, and receiving a question message relevant to a service, the question message being put to the chatroom established through the messenger app;

deriving an answer to the question message, through at least one of multiple chatbots linked to the relay chatbot corresponding to the service account information, by:

transferring the question message information to the relay chatbot, and wherein the question message information is transferred from the relay chatbot to at least one of the multiple chatbots, wherein the at least one of the multiple chatbots is linked to the relay chatbot and to a different relay chatbot, wherein the relay chatbot is provided between the multiple chatbots and the user device, and wherein the relay chatbot and the different relay chatbot are configured to only relay the question message and configured to only select an answer to the question message from multiple answers to the question message provided by the multiple chatbots; and transmitting the derived answer to the messenger server, wherein when the relay chatbot relays a sub relay chatbot linked to the relay chatbot to derive the answer to the question message, the sub relay chatbot is set to relay the question message to multiple chatbots and does not relay the question message to the relay chatbot, but transfer the answers to the question message from the at least one of the multiple chatbots to the relay chatbot.

13. A method for providing an instant messaging service by a chatbot server using a relay chatbot linked to multiple chatbots, comprising:

receiving, from a messenger server corresponding to a messenger app, a selection of a service from multiple services and service account information corresponding to the selected service, establishing a chatroom hosted on the messenger server, through the messenger app and based on the received service account information, between a user device and the relay chatbot to provide the selected service, wherein the relay chatbot is linked to the multiple chatbots, and receiving a question message relevant to the selected service, the question message being input to the chatroom established through the messenger app;

deriving an answer to the question message by:

transferring the question message to the relay chatbot, and wherein the question message is transferred from the relay chatbot to a second relay chatbot linked to the relay chatbot corresponding to the service account information, wherein the question is transferred from the second relay chatbot to at least one of the multiple chatbots, wherein the relay chatbot and the second relay chatbot are provided between the multiple chatbots and the user device, and wherein the relay chatbot and the second relay chatbot are configured to only relay the question message and configured to only select an answer to the question message from multiple answers to the question message provided by the multiple chatbots; and transmitting the answer to the messenger server, wherein when the relay chatbot relays the second relay chatbot linked to the relay chatbot to derive the answer to the question message, the second relay chatbot is set to relay the question message to the multiple chatbots and does not relay the question message to the relay chatbot, but transfer the answers to the question message from the at least one of the multiple chatbots to the relay chatbot.

14. The chatbot server of claim 1, wherein the different relay chatbot is configured to provide a different relay service from that of the relay chatbot.

15. The chatbot server of claim 1, wherein the at least one of the multiple chatbots is configured to:

receive a first question message from the relay chatbot and a second question message from the different relay chatbot, and provide an answer to the first question message to the relay chatbot and an answer to the second question message to the different relay chatbot.

16. The chatbot server of claim 1, wherein the derivation unit is configured to derive the answer to the question message based on bot metadata of the at least one of the multiple chatbots.

17. The chatbot server of claim 1, wherein a service provided by the sub relay chatbot is related to the selected service.

* * * * *